US012006413B2

(12) United States Patent
Adkins et al.

(10) Patent No.: US 12,006,413 B2
(45) Date of Patent: Jun. 11, 2024

(54) POLYMER POLYOLS, PROCESSES FOR THEIR PREPARATION, AND THE USE THEREOF TO PRODUCE FOAMS EXHIBITING RESISTANCE TO COMBUSTION

(71) Applicant: Covestro LLC, Pittsburgh, PA (US)

(72) Inventors: Rick Adkins, Canonsburg, PA (US); Shriniwas Chauk, Sewickley, PA (US); Jose Pazos, Charleston, WV (US)

(73) Assignee: Covestro LLC, Pittsburgh, PA (US)

( * ) Notice: Subject to any disclaimer, the term of this patent is extended or adjusted under 35 U.S.C. 154(b) by 23 days.

(21) Appl. No.: 17/573,948

(22) Filed: Jan. 12, 2022

(65) Prior Publication Data
US 2023/0220174 A1 Jul. 13, 2023

(51) Int. Cl.
C08F 290/06 (2006.01)
C08G 18/08 (2006.01)
C08G 18/18 (2006.01)
C08G 18/22 (2006.01)
C08G 18/24 (2006.01)
C08G 18/32 (2006.01)
C08G 18/48 (2006.01)
C08G 18/63 (2006.01)
C08G 18/65 (2006.01)
C08G 18/67 (2006.01)
C08G 18/72 (2006.01)
C08G 18/75 (2006.01)
C08G 18/76 (2006.01)
C08G 18/80 (2006.01)
C08G 18/81 (2006.01)
C08J 9/00 (2006.01)
C08J 9/12 (2006.01)

(52) U.S. Cl.
CPC ........ C08J 9/0061 (2013.01); C08G 18/0876 (2013.01); C08G 18/1833 (2013.01); C08G 18/3206 (2013.01); C08G 18/632 (2013.01); C08G 18/636 (2013.01); C08G 18/6564 (2013.01); C08G 18/7621 (2013.01); C08J 9/125 (2013.01); C08J 2205/06 (2013.01); C08J 2375/08 (2013.01)

(58) Field of Classification Search
None
See application file for complete search history.

(56) References Cited

U.S. PATENT DOCUMENTS

| | | | |
|---|---|---|---|
| 4,460,715 A * | 7/1984 | Hoffman | C08F 283/06 524/852 |
| 4,463,107 A | 7/1984 | Simroth et al. | |
| 4,581,418 A * | 4/1986 | Serratelli | C08F 299/00 525/49 |
| 5,194,493 A * | 3/1993 | Hayes | C08G 18/636 525/107 |
| 5,196,476 A | 3/1993 | Simroth | |
| 5,359,019 A | 10/1994 | Gastinger et al. | |
| 5,672,761 A | 9/1997 | Adkins et al. | |
| 5,688,861 A | 11/1997 | Simroth et al. | |
| 5,955,534 A | 9/1999 | Simroth et al. | |
| 7,160,975 B2 | 1/2007 | Adkins et al. | |
| 7,179,882 B2 | 2/2007 | Adkins et al. | |
| 7,456,229 B2 | 11/2008 | Chauk et al. | |
| 7,776,969 B2 | 8/2010 | Adkins | |
| 8,017,664 B2 | 9/2011 | Heinis et al. | |
| 8,383,733 B2 | 2/2013 | Adkins et al. | |
| 8,835,565 B2 | 9/2014 | England et al. | |
| 8,946,313 B2 | 2/2015 | Adkins et al. | |
| 8,987,396 B2 | 3/2015 | Adkins et al. | |
| 9,163,099 B2 | 10/2015 | Adkins et al. | |
| 9,505,881 B1 | 11/2016 | Adkins et al. | |
| 10,040,903 B2 | 8/2018 | Adkins et al. | |
| 10,239,985 B2 | 3/2019 | Adkins et al. | |
| 10,479,862 B2 | 11/2019 | Adkins | |
| 10,544,158 B1 | 1/2020 | Loveday et al. | |
| 10,767,008 B2 | 9/2020 | Adkins | |
| 10,851,239 B2 | 12/2020 | Adkins et al. | |
| 11,161,193 B2 | 11/2021 | Schartner et al. | |
| 2003/0004217 A1 | 1/2003 | Kawamoto et al. | |
| 2005/0085613 A1 | 4/2005 | Adkins et al. | |
| 2009/0016313 A1 | 1/2009 | Wu | |
| 2010/0036082 A1 * | 2/2010 | Nakada | C08G 18/4072 528/392 |
| 2011/0306728 A1 | 12/2011 | Adkins et al. | |
| 2014/0066536 A1 | 3/2014 | Adkins et al. | |
| 2014/0249274 A1 | 9/2014 | Adkins | |
| 2014/0275310 A1 | 9/2014 | Adkins et al. | |
| 2017/0306076 A1 | 10/2017 | Adkins et al. | |
| 2021/0102040 A1 | 4/2021 | Adkins et al. | |

FOREIGN PATENT DOCUMENTS

CN 109096575 A 12/2018
JP H06192347 A * 7/1994

OTHER PUBLICATIONS

Machine translation of JP-H06192347-A obtained from Clarivate Analytics in May 2023 (Year: 2023).*
U.S. Appl. No. 17/625,107, filed Jan. 6, 2022, entitled : Polymer Polyol Compositions and Their Use in the Production of Flexible Polyurethane Foams by Brian L. Neal et al.
U.S. Appl. No. 17/625,112, filed Jan. 6, 2022, entitled : Polymer Polyol Compositions and Their Use in the Production of Flexible Polyurethane Foams by Rick L. Adkins et al.

(Continued)

Primary Examiner — Melissa A Rioja
(74) Attorney, Agent, or Firm — Donald R. Palladino

(57) ABSTRACT

Polymer polyols ("PMPOs"), processes for their production, and the use of such PMPOs, particularly in the production of flexible polyurethane foams. The PMPOs are produced using an ethylenically unsaturated composition that includes a crosslinker that results in crosslinks in the PMPO polymer particles that may decompose when exposed to flame temperatures. The PMPOs is capable of providing a flexible polyurethane foam that may exhibit combustibility resistance properties.

20 Claims, No Drawings

(56) References Cited

OTHER PUBLICATIONS

U.S. Appl. No. 17/625,114, filed Jan. 6, 2022, entitled : Amino Diphenylamine-Started Polyether Polyols, Methods for Their Production, and Flexible Polyurethane Foams Produced Using Such Polyols by Brian L Neal et al.
U.S. Appl. No. 17/463,945, filed Sep. 1, 2021, entitled : Processes for Producing Filled Polyol Compositions by Rick L. Adkins et al.
U.S. Appl. No. 17/313,122, filed May 6, 2021, entitled : Glycidyl (Meth)Acrylate Polymer Polyol Stabilizers by Rick L. Adkins et al.
U.S. Appl. No. 17/463,969, filed Sep. 1, 2021, entitled : Filled Polyol Compositions That Include a Triazole by Rick L. Adkins et al.

* cited by examiner

POLYMER POLYOLS, PROCESSES FOR THEIR PREPARATION, AND THE USE THEREOF TO PRODUCE FOAMS EXHIBITING RESISTANCE TO COMBUSTION

FIELD

This specification pertains to polymer polyols ("PM-POs"), processes for their production, and to their use, particularly in the production of flexible polyurethane foams. The resulting flexible polyurethane foams may exhibit combustibility resistance properties.

BACKGROUND

PMPOs are dispersions of polymer particles in a base polyol. They are often used commercially to prepare polyurethane foams and elastomers. Slabstock and molded flexible polyurethane foams, for example, are commonly made using PMPOs. Slabstock flexible polyurethane foams are used in carpet, furniture and bedding applications, for example, while molded flexible polyurethane foams are commonly used in automotive applications.

As can be appreciated, in some of these applications it may be desirable that a flexible polyurethane foam be resistant to combustion. A way to achieve this is to provide a foam that melts to a low viscosity liquid when exposed to a flame. Low viscosity liquids tend to move more quickly away from a flame than a high viscosity liquid, thereby increasing their resistance to combustion. One way to provide a flexible foam that melts to a low viscosity liquid is by reducing the molecular weight of the polymer particles (which are often a reaction production of styrene and acrylonitrile) in the PMPO. This has been achieved by using chain transfer agents. A problem with this approach, however, has been that reducing the molecular weight of the polymer particles to achieve combustibility resistance has come at the risk of severely compromising the physical properties of the foam.

As a result, it would be desirable to provide PMPOs capable of producing flexible foams exhibiting combustibility resistance, while maintaining foam physical properties.

SUMMARY

In certain respects, this specification relates to PMPOs that comprise polymer particles dispersed in a base polyol. The polymer particles comprise a free radical polymerization reaction product of an ethylenically unsaturated composition comprising a compound of structure (I):

$$R\!-\!\!\!\!(\!X\!-\!Z)_b \quad (I)$$

in which: (i) R comprises an alkyl group, an aryl group, an alkylaryl group, or a cycloaliphatic group, each optionally containing a heteroatom; (ii) each X is independently a unit containing a urethane group, a urea group, an ester group, or a combination thereof; (iii) each Z is independently an alkyl group, an aryl group, an alkylaryl group, optionally containing a heteroatom, that contains reactive unsaturation; and (iv) b has a value of at least 2. The compound of structure (I) is present in an amount of 0.1 to 10% by weight, based on total weight of components used to produce the PMPO.

In other respects, this specification relates to processes for preparing a PMPO. These processes comprise free-radically polymerizing a reaction mixture comprising: (A) a base polyol; (B) a pre-formed stabilizer; (C) an ethylenically unsaturated composition; (D) a free-radical polymerization initiator; and, optionally, (E) a polymer control agent. The ethylenically unsaturated composition comprises a compound of structure (I):

$$R\!-\!\!\!\!(\!X\!-\!Z)_b \quad (I)$$

in which: (i) R comprises an alkyl group, an aryl group, an alkylaryl group, or a cycloaliphatic group, each optionally containing a heteroatom; (ii) each X is independently a unit containing a urethane group, a urea group, an ester group, or a combination thereof; (iii) each Z is independently an alkyl group, an aryl group, an alkylaryl group, optionally containing a heteroatom, that contains reactive unsaturation; and (iv) b has a value of at least 2. The compound of structure (I) is present in an amount of 0.1 to 10% by weight, based on total weight of components used to produce the PMPO.

In still other respects, this specification relates to polyurethane foam-forming compositions that include such PMPOs and to polyurethane foams produced from such foam-forming compositions.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" or "OH number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol—Equivalent Weight (g/eq)=(56.1× 1000)/OH number.

As used herein, "monomer" means the simple unpolymerized form of a chemical compound having relatively low molecular weight, e.g., acrylonitrile, styrene, methyl methacrylate, and the like.

As used herein, "polymerizable ethylenically unsaturated compound" means a compound containing ethylenic unsaturation (C=C, i.e., two double bonded carbon atoms) that is capable of undergoing free radically induced addition polymerization reactions.

As used herein, "pre-formed stabilizer" means an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

As used herein "viscosity" is in millipascal-seconds (mPas) measured at 25° C. on an Anton Paar SVM3000 viscometer.

As indicated, certain implementations of the present specification are directed to PMPOs that comprise a dispersion of polymer particles in a polyol, the polyol sometimes being referred to as a base polyol. In some embodiments, the PMPOs are sometimes characterized by a solids content, i.e., content of polymer particles, of 30% by weight to 75% by weight, such as 35% by weight to 70% by weight, 40% by weight to 60% by weight, or 45% by weight to 55% by weight, based on the total weight of the PMPO. Moreover, in some implementations, the PMPO has a viscosity (as defined above) of less than 50,000 mPas, less than 40,000 mPas, less than 30,000 mPas, less than 20,000 mPas or, in some cases, less than 10,000 mPas.

Suitable base polyols include, for example, polyether polyols having a functionality of 2 to 8, such as 2 to 6 or 3 to 6, and an OH number of 20 to 400 mg KOH/g, 20 to 200 mg KOH/g, 20 to 150 mg KOH/g, 20 to 100 mg KOH/g, or, in some cases, 20 to 50 mg KOH/g, 25 to 50 mg KOH/g, or 30 to 50 mg KOH/g.

Specific examples of suitable base polyols include polyoxyethylene glycols, polyoxyethylene triols, polyoxyethylene tetrols and higher functionality polyoxyethylene polyols, polyoxypropylene glycols, polyoxypropylene triols, polyoxypropylene tetrols and higher functionality polypropylene polyols, mixtures thereof. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylolpropane, glycerol, pentaerythritol, sorbitol, sucrose, ethylenediamine, toluene diamine, etc. The alkoxylation reaction may be catalyzed using any conventional catalyst including, for example, potassium hydroxide (KOH) or a double metal cyanide (DMC) catalyst.

Other suitable polyether polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2, 4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside and ethyl glucoside, glycol glucosides, such as ethylene glycol glycoside, propylene glycol glucoside, glycerol glucoside, and 1,2,6-hexanetriol glucoside, as well as alkylene oxide adducts of the alkyl glycosides.

Other suitable base polyols include the polyphenols, such as the alkylene oxide adducts thereof, wherein the alkylene oxides have from 2 to 4 carbon atoms. Among the polyphenols which are suitable are, for example, bisphenol A, bisphenol F, condensation products of phenol and formaldehyde, the novolac resins, condensation products of various phenolic compounds and acrolein, including the 1,1,3-tris (hydroxy-phenyl)propanes, condensation products of various phenolic compounds and glyoxal, glutaraldehyde, other dialdehydes, including the 1,1,2,2-tetrakis(hydroxyphenol) ethanes.

The alkylene oxide adducts of phosphorus and polyphosphorus acid are also suitable base polyols. These include ethylene oxide, 1,2-epoxy-propane, the epoxybutanes, 3-chloro-1,2-epoxypropane as alkylene oxides. Phosphoric acid, phosphorus acid, polyphosphoric acids, such as tripolyphosphoric acid, and the polymetaphosphoric acids are suitable for use herein.

Of course, blends or mixtures of various useful polyols may be used if desired.

The polymer particles in the PMPO comprise a free radical polymerization reaction product of an ethylenically unsaturated composition. Suitable ethylenically unsaturated compounds for use in the ethylenically unsaturated composition include, for example, aliphatic conjugated dienes, such as butadiene and isoprene, monovinylidene aromatic monomers, such as styrene, α-methyl-styrene, (t-butyl)styrene, chlorostyrene, cyanostyrene and bromostyrene; α,β-ethylenically unsaturated carboxylic acids and esters thereof, such as acrylic acid, methacrylic acid, methyl methacrylate, ethyl acrylate, 2-hydroxyethyl acrylate, butyl actylate, itaconic acid, and maleic anhydride, α,β-ethylenically unsaturated nitriles and amides, such as acrylonitrile, methacrylonitrile, acrylamide, methacrylamide, N,N-dimethyl acrylamide, and N-(dimethylaminomethyl)-acrylamide, vinyl esters, such as vinyl acetate, vinyl ethers, vinyl ketones, and vinyl and vinylidene halides, among others. Of course, mixtures of two or more of the aforementioned monomers are also suitable. In some embodiments, the ethylenically unsaturated monomer comprises at least one of styrene and its derivatives, acrylonitrile, methyl acrylate, methyl methacrylate, and vinylidene chloride.

In some embodiments, the ethylenically unsaturated composition comprises styrene and acrylonitrile. More specifically, in some implementations, styrene and acrylonitrile are used in sufficient amounts such that the weight ratio of styrene to acrylonitrile (S:AN) is within the range of 80:20 to 20:80, such as 75:25 to 25:75.

In addition, according to the PMPOs of this specification, the ethylenically unsaturated composition comprises a compound of structure (I):

in which: (i) R comprises an alkyl group, an aryl group, an alkylaryl group, or a cycloaliphatic group, each optionally containing a heteroatom; (ii) each X is independently a unit containing a urethane group, a urea group, an ester group, or a combination thereof; (iii) each Z is independently an alkyl group, an aryl group, an alkylaryl group, optionally containing a heteratom, that contains reactive unsaturation; and (iv) b has a value of at least 2.

For example, in some implementations, the compound of structure (I) comprises a compound of structure (II):

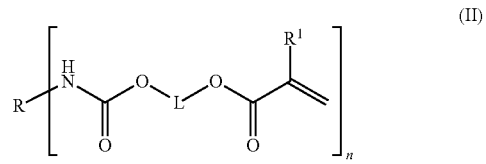

in which: (i) R comprises an alkyl group, an aryl group, an alkylaryl group, or a cycloaliphatic group, each optionally containing a heteroatom; (ii) each L is independently a linking group containing at least 2 carbon atoms; (iii) each $R^1$ is independently H or $CH_3$; and (iv) n has a value of at least 2.

Compounds of structure (II) can be prepared by reacting a polyisocyanate with a hydroxy-functional ethylenically unsaturated compound. As used herein, the term "polyisocyanate" encompasses diisocyanates, as well as isocyanates of greater functionality than 2.0.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates, as well as mixture of any two or more thereof.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

Suitable hydroxy-functional ethylenically unsaturated compounds for use in preparing compounds of structure (II) include hydroxy-functional compounds containing (meth)acryloyl groups, i.e., hydroxyalkyl esters of acrylic or methacrylic acid containing 1 to 8 carbons in the alkyl group, such as the 2-hydroxy-ethyl, 2-hydroxypropyl, and 2-, 3- or 4-hydroxybutyl esters of the acrylic or methacrylic acid. Other suitable hydroxy-functional ethylenically unsaturated compounds include β,γ-ethylenically unsaturated ether alcohols, such as those having 5 to 14 carbon atoms, and containing at least one, in some cases at least two, β,γ-ethylenically unsaturated ether groups, such as allyl alcohol, glycerol diallyl ether, trimethylol propane diallyl ether and pentaerythritol triallyl ether; hydroxyalkyl vinyl ethers, such as 2-hydroxyethyl vinyl ether and 4-hydroxybutyl vinyl ether; reaction products of (meth)acrylic acids with monoepoxide compounds; addition products of 1 or more moles of ε-caprolactone with 1 mole of the hydroxyalkyl (meth)acrylic esters; and alkoxylation products of these hydroxyalkyl (meth)acrylic esters, such as with propylene oxide or ethylene oxide.

In some implementations, the compound of structure (I) comprises a compound of structure (III):

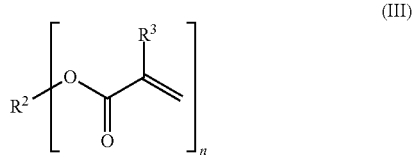

(III)

in which: (i) $R^2$ comprises an alkyl or oxyalkyl group containing at least 2 carbon atoms; (ii) each $R^3$ is independently H or $CH_3$; and (iii) n has a value of at least 2.

Compounds of structure (III) are (meth)acrylic esters of polyols, specific examples of which include, but are not limited to, trimethylolpropane triacrylate, trimethylolpropane trimethacrylate, ethoxylated trimethylolpropane triacrylate, glyceryl propoxy triacrylate, propylene glycol diacrylate, ethylene glycol diacrylate, ethylene glycol dimethacrylate, ethylene glycol diacrylate, tetraethylene glycol diacrylate, triethylene glycol dimethacrylate, tripropylene glycol dimethacrylate, polypropylene glycol diacrylate, polyethylene glycol diacrylate, butanediol diacrylate, butanediol dimethacrylate, pentaerythritol triacrylate, pentaerythritol tetraacrylate, ethoxylated bisphenol A diacrylate, hexane diol diacrylate, dipentaerythritol monohydroxypentaacrylate, neopentyl glycol diacrylate, neopentyl glycol dimethacrylate, tris(2-hydroxyethyl)isocyanurate triacrylate, as well as mixtures of any two or more thereof.

In some implementations, the compound of structure (I) comprises a compound of structure (IV):

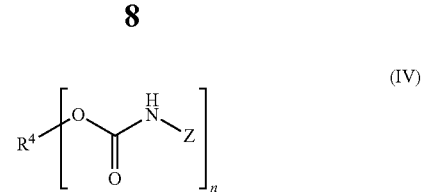

(IV)

in which: (i) $R^4$ comprises an alkyl or oxyalkyl group containing at least 2 carbon atoms; (ii) Z is an alkyl or aryl group containing reactive unsaturation; and (iii) n has a value of at least 2.

Compounds of structure (IV) can be prepared by reacting a hydroxyl-containing compound and an isocyanate that contains reactive unsaturation. Suitable such isocyanates include, for example, isopropenyl dimethyl benzyl isocyanate, 2-isocyanatoethyl methacrylate, adducts of isophorone diisocyanate and 2-hydroxyethyl methacrylate, and adducts of toluenediisocyanate and 2-hydroxypropyl acrylate, among others, including mixtures of any two or more thereof.

As indicated, the PMPOs of this specification comprise polymer particles that are a free radical polymerization reaction product of an ethylenically unsaturated composition comprising the aforementioned compounds. The PMPOs of this specification are thus to be distinguished from the situation in which a dispersant is prepared by free radical polymerization, in the presence of a polyol, of an ethylenically unsaturated composition that includes a compound of structure (I), in which the resulting dispersant is subsequently present with an ethylenically unsaturated composition during formation of the PMPO particles. In such a case, the dispersant no longer includes ethylenic unsaturation and, as a result, is not a component of the ethylenically unsaturated composition that produces the polymer particles.

In the PMPOs of this specification, the compound of structure (I) is present in an amount of 0.1 to 10% by weight, such as 0.1 to 5% by weight, or 1 to 5% by weight, based on the total weight of components used to produce the PMPO.

In addition to the base polyol and the ethylenically unsaturated composition, the reaction mixture used to produce the PMPO may contain other components.

For example, in some implementations, a pre-formed stabilizer present in the reaction mixture used to produce the PMPO. More specifically, in some implementations, the pre-formed stabilizer comprises the reaction product of a reaction mixture comprising: (a) a macromer that contains reactive unsaturation, (b) an ethylenically unsaturated compound, (c) a free radical initiator, (d) a polymer control agent; and, in some cases, (e) a chain transfer agent.

In some implementations, the macromer utilized to produce the pre-formed stabilizer comprises the reaction product of a reaction mixture comprising: (i) an H-functional starter having a functionality of 2 to 8 and a hydroxyl number of 20 to 50; (ii) from 0.1 to 3% by weight, based on 100% by weight of the sum of components (i), (ii) and (iii), of a hydroxyl-reactive compound that contains reactive unsaturation; and (iii) from 0 to 3% by weight, such as 0.05 to 2.5% by weight, or 0.1 to 1.5% by weight, based on 100% by weight of the sum of components (i), (ii) and (iii), of a diisocyanate.

Suitable pre-formed stabilizers can be prepared by reacting a combination of components (a), (b), (c) and (d), and optionally, (e), as described above, in a reaction zone maintained at a temperature sufficient to initiate a free radical reaction, and under sufficient pressure to maintain only liquid phases in the reaction zone, for a sufficient period of time to react (a), (b) and (c); and recovering a mixture containing the pre-formed stabilizer dispersed in the polymer control agent.

Suitable starters for use in preparing the macromer include compounds having a hydroxyl functionality of 2 to 8, such as 3 to 6, and a hydroxyl number of 20 to 50, such as 25 to 40. A specific example of a suitable starter is an alkylene oxide adduct of a hydroxyl functional compound, such as ethylene glycol, propylene glycol, diethylene glycol, dipropylene glycol, tripropylene glycol, glycerin, trimethylolpropane, pentaerythritol, sorbitol, ethylenediamine, and toluene diamine, among others, including mixtures of any two or more thereof, in which the alkylene oxide comprises, for example, propylene oxide, ethylene oxide, butylene oxide, or styrene oxide, among others, including mixtures of any two or more thereof. When a mixture of alkylene oxides are used to form the starter, a mixture of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possible to use a combination of simultaneous and sequential addition of alkylene oxides. In one embodiment, an alkylene oxide such as propylene oxide may be added first, and then a second alkylene oxide such as ethylene oxide added as a cap.

Other examples of suitable starters for preparing the macromer are polyoxyethylene glycols, triols, tetrols and higher functionality polyols, and mixtures thereof, as well as alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, and alkylene oxide adducts of polyhydroxyalkanes other than those described above. Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, and mannitol. Specific examples of alkylene oxide adducts of non-reducing sugars, include those where the alkoxides have from 2 to 4 carbon atoms. Non-reducing sugars and sugar derivatives include sucrose, alkyl glycosides, such as methyl glycoside and ethyl glucoside, glycol glucosides, such as ethylene glycol, glycoside, propylene glycol glucoside, glycerol glucoside, and 1,2,6-hexanetriol glucoside, and alkylene oxide adducts of the alkyl glycosides. Other suitable polyols starters for preparing the macromer include polyphenols, such as alkylene oxide adducts thereof, wherein the alkylene oxides have from 2 to 4 carbon atoms. Suitable polyphenols include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes.

In some implementations, the starter used to prepare the macromer has a functionality of from 3 to 6 and a hydroxyl number of from 25 to 40 mg KOH/g, and is prepared by reacting a starter such as glycerin, trimethylolpropane, pentaerythritol, dipentaerythritol, sorbitol, mannitol, or a mixture of any two or more thereof, with an alkylene oxide comprising at least one of propylene oxide and/or ethylene oxide. In some of these embodiments, ethylene oxide is utilized in an amount of 1 to 40% by weight, such as 5 to 30% by weight or 10 to 25% by weight, based on the total weight of the starter compound. In some embodiments, all or a portion of the ethylene oxide is added as a cap on the end of the starter compound. Suitable amounts of ethylene oxide to be added as a cap range from, for example, 1 to 40% by weight, such as 3 to 30% by weight or 5 to 25% by weight, based on the total weight of starter.

As indicated earlier, in some implementations, the reaction mixture used to produce the macromer utilized to produce the pre-formed stabilizer also comprises a hydroxyl-reactive compound that contains reactive unsaturation. Suitable such compounds include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, and adducts of toluenediisocyanate and 2-hydroxypropyl acrylate, among others, including mixtures of any two or more thereof.

As also indicated earlier, in some implementations, the reaction mixture used to produce the macromer utilized to produce the pre-formed stabilizer may also comprise a diisocyanate. Suitable diisocyanates include various isomers of diphenylmethane diisocyanate and isomeric mixtures of diphenylmethane diisocyanate, such as, for example, mixtures of 2,4'-diphenylmethane diisocyanate, 4,4'-diphenylmethane diisocyanate and/or 2,2'-diphenyl-methane diisocyanate. Other suitable isocyanates include toluenediisocyanate, isophoronediisocyanate, hexamethylenediisocyanate, and 4,4'-methylenebis(cyclohexyl isocyanate), among others, includes mixtures of any two or more thereof.

In certain implementations, the macromer is used in an amount of 10 to 40% by weight, such as 15 to 35% by weight, based on the total weight of the reaction mixture used to produce the pre-formed stabilizer.

As previously mentioned, in some implementations, the reaction mixture used to form the pre-formed stabilizer used to produce the PMPO also comprises an ethylenically unsaturated compound. Suitable such ethylenically unsaturated compounds are aliphatic conjugated dienes, such as butadiene and isoprene, monovinylidene aromatic monomers such as styrene, α-methylstyrene, (t-butyl)styrene, chlorostyrene, cyanostyrene and bromostyrene, α,β-ethylenically unsaturated carboxylic acids and esters thereof, such as acrylic acid, methacrylic acid, methyl methacrylate, ethyl acrylate, 2-hydroxyethyl acrylate, butyl acrylate, itaconic acid, maleic anhydride and the like, α,β-ethylenically unsaturated nitriles and amides, such as acrylonitrile, methacrylonitrile, acrylamide, methacrylamide, N,N-dimethyl acrylamide, N-dimethylaminomethyl)acryl-amide and the like, vinyl esters, such as vinyl acetate; vinyl ethers, vinyl ketones, vinyl and vinylidene halides, as well as a wide variety of other ethylenically unsaturated materials which are copolymerizable with the macromer, including mixture of any two or more thereof.

In some implementations, the reaction mixture used to form the pre-formed stabilizer used to produce the PMPO comprises an ethylenically unsaturated monomer comprising a mixture of acrylonitrile and at least one other ethylenically unsaturated comonomer which is copolymerizable with acrylonitrile, such as, for example, styrene and its derivatives, acrylates, methacrylates, such as methyl methacrylate, vinylidene chloride, among others, as well as mixtures of any two or more thereof. When using acrylonitrile with a comonomer, it is sometimes desirable that a minimum of 5 to 15% by weight acrylonitrile be maintained in the system. One specific ethylenically unsaturated monomer mixture suitable for making the pre-formed stabilizer comprises mixtures of acrylonitrile and styrene in which, for example, acrylonitrile is used in an amount of 20 to 80% by weight, such as 30 to 70% by weight, based on the total weight of the monomer mixture, and styrene is used in an amount of 80 to 20% by weight, such as 70 to 30% by weight percent, based on the total weight of the monomer mixture. In some cases, the ethylenically unsaturated composition used to make the pre-formed stabilizer consists of only monofunctional monomers, such as styrene and/or acrylonitrile.

In certain implementations, the ethylenically unsaturated compound is used in an amount of 10 to 30% by weight, such as 15 to 25% by weight, based on the total weight of the reaction mixture used to produce the pre-formed stabilizer.

The reaction mixture used to produce the pre-formed stabilizer, in certain implementations, also include a free radical initiator. Exemplary suitable free-radical initiators include peroxides, including both alkyl and aryl hydroperoxides, persulfates, perborates, percarbonates, and azo compounds. Some specific examples include hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile). In some cases, the catalyst selected is one having a half-life that is 25 percent or less of the residence time in the reactor at a given temperature. Representative examples of useful initiators species include t-butyl peroxy-2-ethyl-hexanoate, t-butylperpivalate, t-amyl peroctoate, 2,5-dimethyl-hexane-2,5-di-per-2-ethyl hexoate, t-butylperneodecanoate, and t-butylperbenzoate, as well as azo compounds, such as azobis-isobutyronitrile, 2,2'-azo bis-(2-methylbutyro-nitrile), and mixtures thereof.

In some implementations, the free radical initiator is used in an amount of 0.01 to 2% by weight, such as 0.05 to 1% by weight or 0.05 to 0.3% by weight, based on the total weight of the reaction mixture used to produce the pre-formed stabilizer.

The reaction mixture used to produce the pre-formed stabilizer, in certain implementations, also include a polymer control agent. Suitable polymer control agents include various mono-ols (i.e. monohydroxy alcohols), aromatic hydrocarbons, and ethers. Specific examples of suitable polymer control agents are alcohols containing at least one carbon atom, such as methanol, ethanol, n-propanol, isopropanol, n-butanol, sec.-butanol, t-butanol, n-pentanol, 2-pentanol, 3-pentanol, and the like, and mixtures of any two or more thereof. Other suitable polymer control agents include ethylbenzene and toluene. The polymer control agent can be used in substantially pure form (i.e. as commercially available) or can be recovered in crude form from the PMPO production process and reused as-is. For instance, if the polymer control agent is isopropanol, it can be recovered from the PMPO process and used at any point in a subsequent product campaign in which the isopropanol is present.

In certain implementations, the polymer control agent is used in an amount of 30 to 80% by weight, such as 40 to 70% by weight, based on the total weight of the reaction mixture used to produce the pre-formed stabilizer.

As previously indicated, the reaction mixture used to produce the pre-formed stabilizer, in certain implementations, may also include a chain transfer agent. Suitable chain transfer agents include alkylene oxide adducts having a hydroxyl functionality of greater 3. In some implementations, the chain transfer agent is the same as or equivalent to the polyol used in the formation of precursor used to prepare the pre-formed stabilizer. In certain implementations, the chain transfer agent is used in an amount of 0 to 40% by weight, such as 0 to 20% by weight, or, in some cases, 0 to 10% by weight, based on the total weight of the reaction mixture used to produce the pre-formed stabilizer.

The pre-formed stabilizer can be produced by a process similar to that of making the PMPO. The temperature range is not critical and may vary from, for example, 80° C. to 150° C., such as 115° C. to 125° C. The mixing conditions employed can, for example, be those obtained using a back mixed reactor (e.g.—a stirred flask or stirred autoclave).

As indicated earlier, the reaction mixture used to produce certain implementations of the PMPO also comprises a free radical initiator. Suitable such free-radical initiators include, for example, any of those described previously with respect to the production of the pre-formed stabilizer. In certain implementations, the free-radical initiator is present in the reaction mixture used to produce the PMPO in an amount of 0.01 to 2% by weight, based on 100% by weight of the final PMPO.

In some implementations, the reaction mixture used in preparing the PMPO further comprises a chain transfer agent. Examples of suitable chain transfer agents are mercaptans, such as dodecane thiol, ethane thiol, octane thiol, and toluene thiol, halogenated hydrocarbons, such as carbon tetrachloride, carbon tetrabromide, and chloroform, amines, such as diethylamine, and enol-ethers. In some embodiments, if used, the chain transfer agent is used in an amount of 0.1 to 2% by weight, such as 0.2 to 1% by weight, based on the total weight of the reaction mixture used to produce the PMPO.

It was discovered, surprisingly, that the PMPOs described herein are capable of being used in polyurethane foam-forming composition to produce flexible polyurethane foams with improved resistance to combustion. It is currently believed that, by utilization of a compound of structure (I) and/or a compound of structure (II), each as described above, both of which function as a crosslinker during production of the polymer particles in the PMPO, resistance to combustion is improved because, at flame temperature, the crosslinks decompose thereby reducing the molecular weight of the polymer particles, allowing the PMPO to flow away from the flame. Also, the presence of such a crosslinker enables the flexible foam to exhibit good physical properties. As a result, foam physical properties are not compromised while improvement combustion resistance.

The foregoing PMPOs can be made using any process (including continuous and semi-batch) and reactor configuration that is known to be suitable to prepare PMPO, such as, for example, a two-stage reaction system comprising a continuously-stirred tank reactor (CSTR) fitted with impeller(s) and baffles (first-stage) and a plug-flow reactor (second stage). Furthermore, the reaction system can utilize a wide range of mixing conditions. The reaction system may be characterized by energy inputs of from 0.5 to 350 horsepower per 1000 gallons, such as 2 to 50 horsepower per 1000 gallons on average for the bulk phase volume of each reactor as a particularly useful mixing power input. Mixing can be provided by any combination of impeller(s) and pump-around loop/jet mixing. In addition, such PMPOs can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare PMPOs, a residence time ranging of 20 to 180 minutes for the first reactor may be particularly useful.

In some implementations, the reactants are pumped from feed tanks through an in-line static mixer, and then, through a feed tube into the reactor. It may be particularly useful to prepare a premix of the initiator with part of the polyol stream, as well as of polyol and stabilizer. In general, feed stream temperatures are ambient (i.e. 25° C.). However, if desired, feed streams can be heated prior to mixing and entering the reactor. Other process conditions, which may be useful, include cooling of the feed tube in the reactor. Furthermore, the suitable reaction conditions for PMPOs in general may be characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling.

In many cases, the PMPO is produced by utilizing a low monomer to polyol ratio which is maintained throughout the reaction mixture during the process. This can be achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol. The temperature range is not critical and may vary from, for example, 80° C. to 200° C., 100° C. to 140° C., or, in some cases, 115° C. to 125° C.

One suitable continuous process for making PMPOs of this specification comprises (1) providing a heterogenous mixture of the pre-formed stabilizer and, optionally, liquid diluent, in combination with base polyol, the ethylenically unsaturated composition, and a free radical polymerization initiator, (2) in a reaction zone maintained at a temperature sufficient to initiate a free radical reaction, and under sufficient pressure to maintain only liquid phases in the reaction zone, for a period of time sufficient to react at least a major portion of the ethylenically unsaturated composition to form a heterogenous mixture containing the enhanced PMPO, unreacted monomers and diluent, and stripping the unreacted monomers and diluent from the enhanced PMPO to recover the unreacted monomers and diluent.

In some implementations, the polymer particles (whether individual particles or agglomerates of individual particles) are relatively small in size and, in some cases, have a weight average diameter less than ten microns.

Following polymerization, volatile constituents, in particular those from the PCA and residues of monomers are generally stripped from the product by, for example, vacuum distillation, such as in a thin layer of a falling film evaporator. The monomer-free product may be used as is, or may be filtered to remove any large particles that may have been created. In some cases, all of the product will pass through the filter employed in the 150 mesh filtration hindrance test.

Certain embodiments of this specification are directed to polyurethane foams produced using the PMPOs produced as described above, as well to methods of manufacturing such polyurethane foam. As will be appreciated, polyurethane foams can be produced from reacting a reaction mixture comprising: (1) a polyisocyanate component and (2) an isocyanate-reactive component. The isocyanate-reactive component may comprise any of the PMPOs described herein. In addition, the isocyanate-reactive component may include: (i) other polyols, such as a polyether polyol having a functionality of from 2 to 6, an OH number of from 18 to 238, and a number average molecular weight of from 160 to 8000, (ii) a blowing agent, (iii) a catalyst, and (iv) a surfactant.

Suitable blowing agents include halogenated hydrocarbons, halogenated olefins, water, liquid carbon dioxide, low boiling solvents such as, for example, pentane, and other known blowing agents. In some embodiments, the blowing agent comprises, or consists of, water. In certain implementations, blowing agent is used in an amount of 1 to 7 parts, such as 1 to 5 parts, by weight, based on the total weight of the isocyanate-reactive component.

Suitable catalysts include amine and tin based catalysts, such as diethylenetriamine, triethylenediamine, bis(2,2'-dimethylamino)ethyl ether, N,N,N',N'',N''-pentamethyldiethylenetriamine, dibutyltin dilaurate, dibutyltin diacetate, and stannous octoate, and the like. In certain implementations, catalyst is used in an amount of 0.001 to 2 parts by weight, based on the total weight of the isocyanate-reactive component.

In addition, the isocyanate-reactive component may, if desired, include a low molecular weight chain extender and/or cross-linking agent which has a molecular weight of, for example, below 300 Da. Examples include, but are not limited to, glycerine, pentaerythritol, ethylene glycol, sorbitol, and alkanolamines, such as monoethanolamine, diethanolamine (DEOA) and triethanolamine (TEOA). In certain implementations, such chain extender and/or cross-linking agent is used in an amount of up to 5 parts per by weight, such as 0.4 to 3.5 parts by weight, based on the total weight of the isocyanate-reactive component.

Suitable surfactants include, but are not limited to, commercially available polyetherpolysiloxane foam stabilizers.

The polyurethane foam can be prepared by reacting the polyisocyanate component with the isocyanate-reactive component, wherein the polyisocyanate component is present in an amount sufficient to, for example, provide an isocyanate index of 70 to 130, such as 80 to 120 or 90 to 115.

The preparation of free rise foams typically entails mixing all components (except for the isocyanate components) together, then adding the isocyanate component to the mixture and briefly mixing. The mixture is then poured into a box and allowed to rise freely. Settling of the foam is measured, and it is oven cured at, for example, 125° C. for 5 minutes. After 16 hours at room temperature, shrinkage is noted and the foam properties can then be determined by various tests.

The preparation of molded foams typically involves pre-mixing the polyol components along with additives. The isocyanate component is then added to the pre-mix in a sufficient amount to the desired isocyanate index. The reaction mixture is then dispensed by hand or machine into a metal mold which is typically preheated to a temperature of 62 to 66° C. The reaction mixture foams to fill the mold and, after 4 to 5 minutes, the foam is removed from the mold and (physically) crushed to ensure that all cells were opened; and then aged for 2 hours.

Various aspects of the subject matter described herein are set out in the following numbered clauses:

Clause 1. A PMPO comprising polymer particles dispersed in a base polyol, wherein the polymer particles comprise a free radical polymerization reaction product of an ethylenically unsaturated composition comprising a compound of structure (I):

(I)

in which: (i) R comprises an alkyl group, an aryl group, an alkylaryl group, or a cycloaliphatic group, each optionally containing a heteroatom; (ii) each X is independently a unit containing a urethane group, a urea group, an ester group, or a combination thereof; (iii) each Z is independently an alkyl group, an aryl group, an alkylaryl group, optionally containing a heteratom, that contains reactive unsaturation; and (iv) b has a value of at least 2; and wherein the compound of structure (I) and/or the compound of structure (II) is present in an amount of 0.1 to 10% by weight, based on total weight of components used to produce the PMPO.

Clause 2. The PMPO of clause 1, wherein the PMPO has a solids content of 30% by weight to 75% by weight, 35% by weight to 70% by weight, 40% by weight to 60% by weight, or 45% by weight to 55% by weight, based on the total weight of the PMPO.

Clause 3. The PMPO of clause 1 or clause 2, wherein the PMPO has a viscosity of less than 50,000 mPas, less than 40,000 mPas, less than 30,000 mPas, less than 20,000 mPas or less than 10,000 mPas.

Clause 4. The PMPO of any one of clause 1 to clause 3, wherein the base polyol comprises a polyether polyol having a functionality of 2 to 8, 2 to 6 or 3 to 6, and an OH number of 20 to 400 mg KOH/g, 20 to 200 mg KOH/g, 20 to 150 mg KOH/g, 20 to 100 mg KOH/g, 20 to 50 mg KOH/g, 25 to 50 mg KOH/g, or 30 to 50 mg KOH/g.

Clause 5. The PMPO of any one of clause 1 to clause 4, wherein the base polyol comprises a polyoxyethylene glycol, a polyoxyethylene triol, a polyoxyethylene tetrol, a polyoxypropylene glycols, a polyoxypropylene triol, a polyoxypropylene tetrol, or a mixture of any two or more thereof.

Clause 6. The PMPO of any one of clause 1 to clause 5, wherein the ethylenically unsaturated composition comprises an aliphatic conjugated diene, such as butadiene and/or isoprene, a monovinylidene aromatic monomer, such as styrene, α-methyl-styrene, (t-butyl)styrene, chlorostyrene, cyanostyrene, bromostyrene, or a mixture of any two or more thereof, an α,β-ethylenically unsaturated carboxylic acids and/or ester thereof, such as acrylic acid, methacrylic acid, methyl methacrylate, ethyl acrylate, 2-hydroxyethyl acrylate, butyl actylate, itaconic acid, and maleic anhydride, an α,β-ethylenically unsaturated nitriles and amides, such as acrylonitrile, methacrylonitrile, acrylamide, methacrylamide, N,N-dimethyl acrylamide, N-(dimethylaminomethyl)-acrylamide or a mixture of any two or more thereof, a vinyl ester, such as vinyl acetate, a vinyl ether, a vinyl ketone, a vinyl halide, a vinylidene halide, among others, as well as mixtures of two or more thereof.

Clause 7. The PMPO of clause 6, wherein the ethylenically unsaturated composition comprises at least one of styrene and its derivatives, acrylonitrile, methyl acrylate, methyl methacrylate, and vinylidene chloride.

Clause 8. The PMPO of clause 7, wherein the ethylenically unsaturated composition comprises styrene and acrylonitrile, such as where styrene and acrylonitrile are present in amounts such that the weight ratio of styrene to acrylonitrile (S:AN) is within the range of 80:20 to 20:80, such as 75:25 to 25:75.

Clause 9. The PMPO of any one of clause 1 to clause 8, wherein the compound of structure (I) comprises a compound of structure (II):

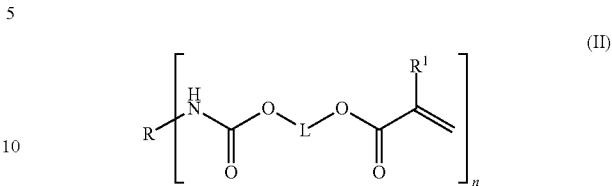
(II)

in which: (i) R comprises an alkyl group, an aryl group, an alkylaryl group, or a cycloaliphatic group, each optionally containing a heteroatom; (ii) each L is independently a linking group containing at least 2 carbon atoms; (iii) each $R_1$ is independently H or $CH_3$; and (iv) n has a value of at least 2.

Clause 10. The PMPO of clause 9, wherein the compound of structure (II) is a reaction product of a polyisocyanate and a hydroxy-functional ethylenically unsaturated compound.

Clause 11. The PMPO of clause 10, wherein the polyisocyanate comprises an aromatic polyisocyanate, an aliphatic polyisocyanate, a cycloaliphatic polyisocyanate, or a mixture of any two or more thereof.

Clause 12. The PMPO of clause 11, wherein the polyisocyanate comprises m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, hexahydro-toluene diisocyanate, isophorone diisocyanate, dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyl-diphenyl-propane-4,4'-diisocyanate, 2,4,6-toluene triisocyanate, 4,4'-dimethyl-diphenyl-methane-2,2',5,5'-tetraisocyanate, a polymethylene polyphenyl-polyisocyanate, or a mixture of any two or more thereof.

Clause 13. The PMPO of any one of clause 10 to clause 12, wherein the hydroxy-functional ethylenically unsaturated compound comprises a hydroxy-functional compound containing (meth)acryloyl groups, such as the 2-hydroxyethyl, 2-hydroxypropyl, 2-, 3- or 4-hydroxybutyl esters of acrylic or methacrylic acid, a β,γ-ethylenically unsaturated ether alcohol, such as those having 5 to 14 carbon atoms, and containing at least one, in some cases at least two, β,γ-ethylenically unsaturated ether groups, such as allyl alcohol, glycerol diallyl ether, trimethylol propane diallyl ether and pentaerythritol triallyl ether; a hydroxyalkyl vinyl ether, such as 2-hydroxyethyl vinyl ether and 4-hydroxybutyl vinyl ether; a reaction product of (meth)acrylic acid with a monoepoxide compound; an addition products of 1 or more moles of ε-caprolactone with 1 mole of hydroxyalkyl (meth)acrylic ester; an alkoxylation product of hydroxyalkyl (meth)acrylic ester, such as with propylene oxide or ethylene oxide, or a mixture of any two or more thereof.

Clause 14. The PMPO of any one of clause 1 to clause 13, wherein the compound of structure (I) comprises a compound of structure (III):

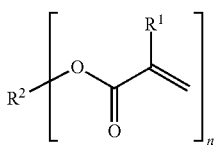

(III)

in which: (i) R² comprises an alkyl or oxyalkyl group containing at least 2 carbon atoms; (ii) each R³ is independently H or CH₃; and (iii) n has a value of at least 2.

Clause 15. The PMPO of clause 14, wherein the compound of structure (III) comprises trimethylolpropane triacrylate, trimethylolpropane trimethacrylate, ethoxylated trimethylolpropane triacrylate, glyceryl propoxy triacrylate, propylene glycol diacrylate, ethylene glycol diacrylate, ethylene glycol dimethacrylate, ethylene glycol diacrylate, tetraethylene glycol diacrylate, triethylene glycol dimethacrylate, tripropylene glycol dimethacrylate, polypropylene glycol diacrylate, polyethylene glycol diacrylate, butanediol diacrylate, butanediol dimethacrylate, pentaerythritol triacrylate, pentaerythritol tetraacrylate, ethoxylated bisphenol A diacrylate, hexane diol diacrylate, dipentaerythritol monohydroxypentaacrylate, neopentyl glycol diacrylate, neopentyl glycol dimethacrylate, tris(2-hydroxyethyl)isocyanurate triacrylate, or a mixture of any two or more thereof.

Clause 16. The PMPO of any one of clause 1 to clause 15, wherein the compound of structure (I) comprises a compound of structure (IV):

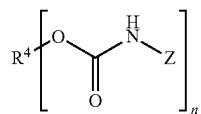

(IV)

in which: (i) R⁴ comprises an alkyl or oxyalkyl group containing at least 2 carbon atoms; (ii) Z is an alkyl or aryl group containing reactive unsaturation; and (iii) n has a value of at least 2.

Clause 17. The PMPO of clause 16, wherein the compound of structure (IV) comprises a reaction product of a hydroxyl-containing compound and an isocyanate that contains reactive unsaturation, such as where the isocyanate comprises isopropenyl dimethyl benzyl isocyanate, 2-isocyanatoethyl methacrylate, an adduct of isophorone diisocyanate and 2-hydroxyethyl methacrylate, an adduct of toluenediisocyanate and 2-hydroxypropyl acrylate, or a mixture of any two or more thereof.

Clause 18. The PMPO of any one of clause 1 to clause 17, wherein the compound of structure (I) is present in an amount of 0.1 to 5% by weight or 1 to 5% by weight, based on the total weight of components used to produce the PMPO.

Clause 19. The PMPO of any one of clause 1 to clause 18, wherein the PMPO further comprises a pre-formed stabilizer.

Clause 20. The PMPO of clause 19, wherein the pre-formed stabilizer comprises a reaction product of a reaction mixture comprising: (a) a macromer that contains reactive unsaturation, (b) an ethylenically unsaturated compound, (c) a free radical initiator, (d) a polymer control agent; and, in some cases, (e) a chain transfer agent.

Clause 21. The PMPO of clause 20, wherein the macromer comprises a reaction product of a reaction mixture comprising: (i) an H-functional starter having a functionality of 2 to 8 and a hydroxyl number of 20 to 50 mg KOH/g; (ii) from 0.1 to 3% by weight, based on 100% by weight of the sum of components (i), (ii) and (iii), of a hydroxyl-reactive compound that contains reactive unsaturation; and (iii) 0 to 3% by weight, such as 0.05 to 2.5% by weight, or 0.1 to 1.5% by weight, based on 100% by weight of the sum of components (i), (ii) and (iii), of a diisocyanate.

Clause 22. The PMPO of clause 21, wherein the H-functional starter (i) has a hydroxyl functionality of 3 to 6 and/or a hydroxyl number of 25 to 40 mg KOH/g.

Clause 23. The PMPO of clause 22, wherein the H-functional starter (i) comprises a reaction product of glycerin, trimethylolpropane, pentaerythritol, dipentaerythritol, sorbitol, mannitol, or a mixture of any two or more thereof, with an alkylene oxide comprising propylene oxide and/or ethylene oxide, wherein ethylene oxide is present in an amount of 1 to 40% by weight, 5 to 30% by weight or 10 to 25% by weight, based on total weight of the H-functional starter (i), such as where all or a portion of the ethylene oxide is added as a cap on the end of the starter (i), such as where ethylene oxide added as a cap range in an amount of 1 to 40% by weight, 3 to 30% by weight or 5 to 25% by weight, based on the total weight of starter (i).

Clause 24. The PMPO of any one of clause 20 to clause 23, wherein the hydroxyl-reactive compound that contains reactive unsaturation comprises methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, an adduct of toluenediisocyanate and 2-hydroxypropyl acrylate, or a mixture of any two or more thereof.

Clause 25. The PMPO of any one of clause 21 to clause 24, wherein the diisocyanate comprises diphenylmethane diisocyanate, such as a mixture of 2,4'-diphenylmethane diisocyanate, 4,4'-diphenylmethane diisocyanate and/or 2,2'-diphenyl-methane diisocyanate, toluenediisocyanate, isophoronediisocyanate, hexamethylenediisocyanate, 4,4'-methylenebis(cyclohexyl isocyanate), or a mixture of any two or more thereof.

Clause 26. The PMPO of any one of clause 21 to clause 25, wherein the macromer is used in an amount of 10 to 40% by weight or 15 to 35% by weight, based on the total weight of the reaction mixture used to produce the pre-formed stabilizer.

Clause 27. The PMPO of any one of clause 20 to clause 26, wherein the ethylenically unsaturated compound used to form the pre-formed stabilizer comprises a mixture of acrylonitrile and at least one other ethylenically unsaturated comonomer which is copolymerizable with acrylonitrile, such as, for example, styrene and its derivatives, acrylates, methacrylates, such as methyl methacrylate, vinylidene chloride, among others, as well as mixtures of any two or more thereof, such as a mixtures of acrylonitrile and styrene in which acrylonitrile is used in an amount of 20 to 80% by weight or 30 to 70% by weight, based on the total weight of the monomer mixture, and styrene is used in an amount of 80 to 20% by weight or 70 to 30% by weight percent, based on the total weight of the monomer mixture.

Clause 28. The PMPO of any one of clause 20 to clause 27, wherein the ethylenically unsaturated compound is used in an amount of 10 to 30% by weight or 15 to 25% by weight, based on the total weight of the reaction mixture used to produce the pre-formed stabilizer.

Clause 29. The PMPO of any one of clause 20 to clause 28, wherein the polymer control agent comprises methanol, ethanol, n-propanol, isopropanol, n-butanol, sec.-butanol, t-butanol, n-pentanol, 2-pentanol, 3-pentanol, ethylbenzene, toluene, or a mixture of any two or more thereof.

Clause 30. The PMPO of any one of clause 20 to clause 29, wherein the polymer control agent is used in an amount of 30 to 80% by weight or 40 to 70% by weight, based on the total weight of the reaction mixture used to produce the pre-formed stabilizer.

Clause 31. The PMPO of any one of clause 20 to clause 30, wherein the chain transfer agent comprises an alkylene oxide adducts having a hydroxyl functionality of greater 3.

Clause 32. The PMPO of any one of clause 20 to clause 31, wherein the chain transfer agent is present in an amount of 0 to 40% by weight, 0 to 20% by weight, or 0 to 10% by weight, based on the total weight of the reaction mixture used to produce the pre-formed stabilizer.

Clause 33. A polyurethane foam comprising a reaction product of a reaction mixture comprising: (1) a polyisocyanate component and (2) an isocyanate-reactive component, wherein the isocyanate-reactive component comprise a PMPO of any one of clause 1 to clause 32.

Clause 34. The polyurethane foam of clause 33, wherein the reaction mixture further comprises a blowing agent, such as where the blowing agent comprises a halogenated hydrocarbons, a halogenated olefin, water, liquid carbon dioxide, a low boiling solvents such as pentane, or a mixture of any two or more thereof, such as where the blowing agent is present in an amount of 1 to 7 parts or 1 to 5 parts, by weight, based on the total weight of the isocyanate-reactive component.

Clause 35. The polyurethane foam of clause 33 or clause 34, wherein the reaction mixture further comprises a catalyst, such as diethylenetriamine, triethylenediamine, bis(2, 2'-di-methylamino)ethyl ether, N,N,N',N'',N''-pentamethyl-diethylenetriamine, dibutyltin dilaurate, dibutyltin diacetate, stannous octoate, or a mixture of any two or more thereof.

Clause 36. The polyurethane foam of any one of clause 33 to clause 35, wherein the reaction mixture further comprises a chain extender and/or cross-linking agent having a molecular weight of below 300 Da, such as glycerine, pentaerythritol, ethylene glycol, sorbitol, an alkanolamine, such as monoethanolamine, diethanolamine, triethanolamine, or a mixture of any two or more thereof, such as where chain extender and/or cross-linking agent is present in an amount of up to 5 parts per by weight or 0.4 to 3.5 parts by weight, based on the total weight of the isocyanate-reactive component.

Clause 37. The polyurethane foam of any one of clause 33 to clause 36, wherein the reaction mixture further comprises a surfactant, such as a polyetherpolysiloxane.

Clause 38. The polyurethane foam of any one of clause 33 to clause 37, wherein the polyisocyanate component and the isocyanate-reactive component are present in amounts to provide an isocyanate index of 70 to 130, 80 to 120 or 90 to 115.

Clause 39. A process for preparing a PMPO comprising free-radically polymerizing a reaction mixture comprising: (A) a base polyol; (B) a pre-formed stabilizer; (C) an ethylenically unsaturated composition; (D) a free-radical polymerization initiator; and, optionally, (E) a polymer control agent, wherein the ethylenically unsaturated composition comprises a compound of structure (I):

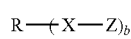
(I)

in which: (i) R comprises an alkyl group, an aryl group, an alkylaryl group, or a cycloaliphatic group, each optionally containing a heteroatom; (ii) each X is independently a unit containing a urethane group, a urea group, an ester group, or a combination thereof; (iii) each Z is independently an alkyl group, an aryl group, an alkylaryl group, optionally containing a heteroatom, that contains reactive unsaturation; and (iv) b has a value of at least 2; wherein the compound of structure (I) is present in an amount of 0.1 to 10% by weight, based on total weight of components used to produce the PMPO.

Clause 40. The process of clause 39, wherein the PMPO has a solids content of 30% by weight to 75% by weight, 35% by weight to 70% by weight, 40% by weight to 60% by weight, or 45% by weight to 55% by weight, based on the total weight of the PMPO.

Clause 41. The process of clause 39 or clause 40, wherein the PMPO has a viscosity of less than 50,000 mPas, less than 40,000 mPas, less than 30,000 mPas, less than 20,000 mPas or less than 10,000 mPas.

Clause 42. The process of any one of clause 39 to clause 41, wherein the base polyol comprises a polyether polyol having a functionality of 2 to 8, 2 to 6 or 3 to 6, and an OH number of 20 to 400 mg KOH/g, 20 to 200 mg KOH/g, 20 to 150 mg KOH/g, 20 to 100 mg KOH/g, 20 to 50 mg KOH/g, 25 to 50 mg KOH/g, or 30 to 50 mg KOH/g.

Clause 43. The process of any one of clause 39 to clause 42, wherein the base polyol comprises a polyoxyethylene glycol, a polyoxyethylene triol, a polyoxyethylene tetrol, a polyoxypropylene glycols, a polyoxypropylene triol, a polyoxypropylene tetrol, or a mixture of any two or more thereof.

Clause 44. The process of any one of clause 39 to clause 43, wherein the ethylenically unsaturated composition comprises an aliphatic conjugated diene, such as butadiene and/or isoprene, a monovinylidene aromatic monomer, such as styrene, α-methyl-styrene, (t-butyl)styrene, chlorostyrene, cyanostyrene, bromostyrene, or a mixture of any two or more thereof, an α,β-ethylenically unsaturated carboxylic acids and/or ester thereof, such as acrylic acid, methacrylic acid, methyl methacrylate, ethyl acrylate, 2-hydroxyethyl acrylate, butyl actylate, itaconic acid, and maleic anhydride, an α,β-ethylenically unsaturated nitriles and amides, such as acrylonitrile, methacrylonitrile, acrylamide, methacrylamide, N,N-dimethyl acrylamide, N-(dimethylaminomethyl)-acrylamide or a mixture of any two or more thereof, a vinyl ester, such as vinyl acetate, a vinyl ether, a vinyl ketone, a vinyl halide, a vinylidene halide, among others, as well as mixtures of two or more thereof.

Clause 45. The process of clause 44, wherein the ethylenically unsaturated composition comprises at least one of styrene and its derivatives, acrylonitrile, methyl acrylate, methyl methacrylate, and vinylidene chloride.

Clause 46. The process of clause 45, wherein the ethylenically unsaturated composition comprises styrene and acrylonitrile, such as where styrene and acrylonitrile are present in amounts such that the weight ratio of styrene to acrylonitrile (S:AN) is within the range of 80:20 to 20:80, such as 75:25 to 25:75.

Clause 47. The process of any one of clause 39 to clause 46, wherein the compound of structure (I) comprises a compound of structure (II):

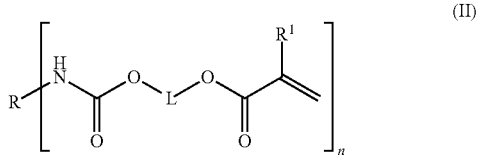
(II)

in which: (i) R comprises an alkyl group, an aryl group, an alkylaryl group, or a cycloaliphatic group, each optionally containing a heteroatom; (ii) each L is independently a linking group containing at least 2 carbon atoms; (iii) each $R_1$ is independently H or $CH_3$; and (iv) n has a value of at least 2.

Clause 48. The process of clause 47, wherein the compound of structure (II) is a reaction product of a polyisocyanate and a hydroxy-functional ethylenically unsaturated compound.

Clause 49. The process of clause 48, wherein the polyisocyanate comprises an aromatic polyisocyanate, an aliphatic polyisocyanate, a cycloaliphatic polyisocyanate, or a mixture of any two or more thereof.

Clause 50. The process of clause 49, wherein the polyisocyanate comprises m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, hexahydro-toluene diisocyanate, isophorone diisocyanate, dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyl-diphenyl-propane-4,4'-diisocyanate, 2,4,6-toluene triisocyanate, 4,4'-dimethyl-diphenyl-methane-2,2',5,5'-tetraisocyanate, a polymethylene polyphenyl-polyisocyanate, or a mixture of any two or more thereof.

Clause 51. The process of any one of clause 48 to clause 50, wherein the hydroxy-functional ethylenically unsaturated compound comprises a hydroxy-functional compound containing (meth)acryloyl groups, such as the 2-hydroxyethyl, 2-hydroxypropyl, 2-, 3- or 4-hydroxybutyl esters of acrylic or methacrylic acid, a β,γ-ethylenically unsaturated ether alcohol, such as those having 5 to 14 carbon atoms, and containing at least one, in some cases at least two, β,γ-ethylenically unsaturated ether groups, such as allyl alcohol, glycerol diallyl ether, trimethylol propane diallyl ether and pentaerythritol triallyl ether; a hydroxyalkyl vinyl ether, such as 2-hydroxyethyl vinyl ether and 4-hydroxybutyl vinyl ether; a reaction product of (meth)acrylic acid with a monoepoxide compound; an addition products of 1 or more moles of ε-caprolactone with 1 mole of hydroxyalkyl (meth) acrylic ester; an alkoxylation product of hydroxyalkyl (meth)acrylic ester, such as with propylene oxide or ethylene oxide, or a mixture of any two or more thereof.

Clause 52. The process of any one of clause 39 to clause 51, wherein the compound of structure (I) comprises a compound of structure (III):

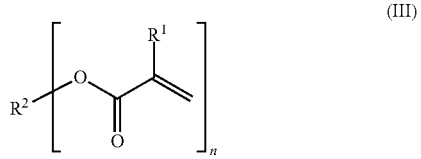
(III)

in which: (i) $R^2$ comprises an alkyl or oxyalkyl group containing at least 2 carbon atoms; (ii) each $R^3$ is independently H or $CH_3$; and (iii) n has a value of at least 2.

Clause 53. The process of clause 52, wherein the compound of structure (III) comprises trimethylolpropane triacrylate, trimethylolpropane trimethacrylate, ethoxylated trimethylolpropane triacrylate, glyceryl propoxy triacrylate, propylene glycol diacrylate, ethylene glycol diacrylate, ethylene glycol dimethacrylate, ethylene glycol diacrylate, tetraethylene glycol diacrylate, triethylene glycol dimethacrylate, tripropylene glycol dimethacrylate, polypropylene glycol diacrylate, polyethylene glycol diacrylate, butanediol diacrylate, butanediol dimethacrylate, pentaerythritol triacrylate, pentaerythritol tetraacrylate, ethoxylated bisphenol A diacrylate, hexane diol diacrylate, dipentaerythritol monohydroxypentaacrylate, neopentyl glycol diacrylate, neopentyl glycol dimethacrylate, tris(2-hydroxyethyl)isocyanurate triacrylate, or a mixture of any two or more thereof.

Clause 54. The process of any one of clause 39 to clause 53, wherein the compound of structure (I) comprises a compound of structure (IV):

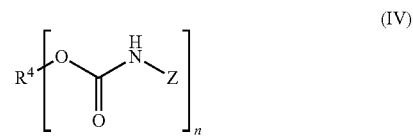
(IV)

in which: (i) $R^4$ comprises an alkyl or oxyalkyl group containing at least 2 carbon atoms; (ii) Z is an alkyl or aryl group containing reactive unsaturation; and (iii) n has a value of at least 2.

Clause 55. The process of clause 54, wherein the compound of structure (IV) comprises a reaction product of a hydroxyl-containing compound and an isocyanate that contains reactive unsaturation, such as where the isocyanate comprises isopropenyl dimethyl benzyl isocyanate, 2-isocyanatoethyl methacrylate, an adduct of isophorone diisocyanate and 2-hydroxyethyl methacrylate, an adduct of toluenediisocyanate and 2-hydroxypropyl acrylate, or a mixture of any two or more thereof.

Clause 56. The process of any one of clause 39 to clause 55, wherein the compound of structure (I) and/or a compound of structure (II) is present in an amount of 0.1 to 5% by weight or 1 to 5% by weight, based on the total weight of components used to produce the PMPO Clause 57. The process of any one of clause 39 to clause 56, wherein the PMPO further comprises a pre-formed stabilizer.

Clause 58. The process of clause 57, wherein the preformed stabilizer comprises a reaction product of a reaction mixture comprising: (a) a macromer that contains reactive unsaturation, (b) an ethylenically unsaturated compound, (c) a free radical initiator, (d) a polymer control agent; and, in some cases, (e) a chain transfer agent.

Clause 59. The process of clause 58, wherein the macromer comprises a reaction product of a reaction mixture comprising: (i) an H-functional starter having a functionality of 2 to 8 and a hydroxyl number of 20 to 50 mg KOH/g; (ii) from 0.1 to 3% by weight, based on 100% by weight of the sum of components (i), (ii) and (iii), of a hydroxyl-reactive compound that contains reactive unsaturation; and (iii) 0 to 3% by weight, such as 0.05 to 2.5% by weight, or 0.1 to 1.5% by weight, based on 100% by weight of the sum of components (i), (ii) and (iii), of a diisocyanate.

Clause 60. The process of clause 59, wherein the H-functional starter (i) has a hydroxyl functionality of 3 to 6 and/or a hydroxyl number of 25 to 40 mg KOH/g.

Clause 61. The process of clause 60, wherein the H-functional starter (i) comprises a reaction product of glycerin, trimethylolpropane, pentaerythritol, dipentaerythritol, sorbitol, mannitol, or a mixture of any two or more thereof, with an alkylene oxide comprising propylene oxide and/or ethylene oxide, wherein ethylene oxide is present in an amount of 1 to 40% by weight, 5 to 30% by weight or 10 to 25% by weight, based on total weight of the H-functional starter (i), such as where all or a portion of the ethylene oxide is added as a cap on the end of the starter (i), such as where ethylene oxide added as a cap range in an amount of 1 to 40% by weight, 3 to 30% by weight or 5 to 25% by weight, based on the total weight of starter (i).

Clause 62. The process of any one of clause 59 to clause 61, wherein the hydroxyl-reactive compound that contains reactive unsaturation comprises methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, an adduct of toluenediisocyanate and 2-hydroxypropyl acrylate, or a mixture of any two or more thereof.

Clause 63. The process of any one of clause 59 to clause 62, wherein the diisocyanate comprises diphenylmethane diisocyanate, such as a mixture of 2,4'-diphenylmethane diisocyanate, 4,4'-diphenylmethane diisocyanate and/or 2,2'-diphenyl-methane diisocyanate, toluenediisocyanate, isophoronediisocyanate, hexamethylenediisocyanate, 4,4'-methylenebis(cyclohexyl isocyanate), or a mixture of any two or more thereof.

Clause 64. The process of any one of clause 59 to clause 63, wherein the macromer is used in an amount of 10 to 40% by weight or 15 to 35% by weight, based on the total weight of the reaction mixture used to produce the pre-formed stabilizer.

Clause 65. The process of any one of clause 58 to clause 64, wherein the ethylenically unsaturated compound used to form the pre-formed stabilizer comprises a mixture of acrylonitrile and at least one other ethylenically unsaturated comonomer which is copolymerizable with acrylonitrile, such as, for example, styrene and its derivatives, acrylates, methacrylates, such as methyl methacrylate, vinylidene chloride, among others, as well as mixtures of any two or more thereof, such as a mixtures of acrylonitrile and styrene in which acrylonitrile is used in an amount of 20 to 80% by weight or 30 to 70% by weight, based on the total weight of the monomer mixture, and styrene is used in an amount of 80 to 20% by weight or 70 to 30% by weight percent, based on the total weight of the monomer mixture.

Clause 66. The process of any one of clause 58 to clause 65, wherein the ethylenically unsaturated compound is used in an amount of 10 to 30% by weight or 15 to 25% by weight, based on the total weight of the reaction mixture used to produce the pre-formed stabilizer.

Clause 67. The process of any one of clause 58 to clause 66, wherein the polymer control agent comprises methanol, ethanol, n-propanol, isopropanol, n-butanol, sec.-butanol, t-butanol, n-pentanol, 2-pentanol, 3-pentanol, ethylbenzene, toluene, or a mixture of any two or more thereof.

Clause 68. The process of any one of clause 58 to clause 67, wherein the polymer control agent is used in an amount of 30 to 80% by weight or 40 to 70% by weight, based on the total weight of the reaction mixture used to produce the pre-formed stabilizer.

Clause 69. The process of any one of clause 58 to clause 68, wherein the chain transfer agent comprises an alkylene oxide adducts having a hydroxyl functionality of greater 3.

Clause 70. The process of any one of clause 58 to clause 69, wherein the chain transfer agent is present in an amount of 0 to 40% by weight, 0 to 20% by weight, or 0 to 10% by weight, based on the total weight of the reaction mixture used to produce the pre-formed stabilizer.

Clause 71. The process of any one of clause 39 to clause 70, wherein the process is a continuous or a semi-batch process, 115° C. to 125° C.

Clause 72. The process of clause 71, wherein the process is a continuous process comprising: (1) providing a heterogenous mixture of the pre-formed stabilizer and, optionally, liquid diluent, in combination with base polyol, the ethylenically unsaturated composition, and a free radical polymerization initiator, (2) in a reaction zone maintained at a temperature sufficient to initiate a free radical reaction, and under sufficient pressure to maintain only liquid phases in the reaction zone, reacting the ethylenically unsaturated composition for a period of time sufficient to react at least a major portion of the ethylenically unsaturated composition to form a heterogenous mixture containing the enhanced PMPO, unreacted monomers and diluent, and (3) stripping the unreacted monomers and diluent from the enhanced PMPO to recover the unreacted monomers and diluent.

Clause 73. A process for preparing a polyurethane foam comprising reacting polyisocyanate component with an isocyanate-reactive component, wherein the isocyanate-reactive component comprise a PMPO produced by the process of any one of clause 39 to clause 72.

Clause 74. The process of clause 73, wherein the reaction takes place in the presence of a blowing agent, such as where the blowing agent comprises a halogenated hydrocarbons, a halogenated olefin, water, liquid carbon dioxide, a low boiling solvents such as pentane, or a mixture of any two or more thereof, such as where the blowing agent is present in an amount of 1 to 7 parts or 1 to 5 parts, by weight, based on the total weight of the isocyanate-reactive component.

Clause 75. The process of clause 73 or clause 74, wherein the reaction takes place in the presence of a catalyst, such as diethylenetriamine, triethylenediamine, bis(2,2'-di-methylamino)ethyl ether, N,N,N',N",N"-pentamethyldiethylenetriamine, dibutyltin dilaurate, dibutyltin diacetate, stannous octoate, or a mixture of any two or more thereof.

Clause 76. The process of any one of clause 73 to clause 75, wherein the reaction takes place in the presence of a chain extender and/or cross-linking agent having a molecular weight of below 300 Da, such as glycerine, pentaerythritol, ethylene glycol, sorbitol, an alkanolamine, such as monoethanolamine, diethanolamine, triethanolamine, or a mixture of any two or more thereof, such as where chain extender and/or cross-linking agent is present in an amount of up to 5 parts per by weight or 0.4 to 3.5 parts by weight, based on the total weight of the isocyanate-reactive component.

Clause 77. The process of any one of clause 73 to clause 76, wherein the reaction takes place in the presence of a surfactant, such as a polyetherpolysiloxane.

Clause 78. The process of any one of clause 73 to clause 77, wherein the polyisocyanate component and the isocyanate-reactive component are reacting at an isocyanate index of 70 to 130, 80 to 120 or 90 to 115.

Clause 79. A polyurethane foam produced by the process of one of clause 69 to clause 78.

The non-limiting and non-exhaustive examples that follow are intended to further describe various non-limiting and non-exhaustive implementations without restricting the scope of the implementations described in this specification.

EXAMPLES

The following components were used to prepare the PMPOs and foams:
Polyol A: a propylene oxide adduct of sorbitol, containing an 8% ethylene oxide cap, and having a hydroxyl number of 28 mg KOH/g;
Polyol B: a propylene oxide adduct of sorbitol, containing a 16% ethylene oxide cap, and having a hydroxyl number of 28 mg KOH/g;
Polyol C: a propylene oxide adduct of sorbitol, containing a 12% ethylene oxide cap, and having a hydroxyl number of 32 mg KOH/g;
Polyol D: a 88/12 propylene oxide/ethylene oxide adduct of glycerin, having a hydroxyl number of 52 mg KOH/g;
Polyol E: a propylene oxide adduct of glycerin, containing a 20% ethylene oxide cap, and having a hydroxyl number of 35 mg KOH/g;
Polyol F: a propylene oxide adduct of sorbitol and glycerin, containing a 17% ethylene oxide cap, and having a hydroxyl number of 31 mg KOH/g;
MDI: Diphenylmethane diisocyanate (MDI) with a % NCO of about 33.6, commercially available from Covestro LLC (Mondur® ML);
PMDI: an aromatic polymeric isocyanate based on diphenylmethane-diisocyanate (MDI) with approximately 30% NCO content and a functionality>2.0;
IPDI: Isophorone diisocyanate with a % NCO of about 37.8, commercially available from Covestro LLC (Desmodur® I);
TDI: Toluene diisocyanate containing approximately 80% by weight of the 2,4-isomer and about 20% by weight of the 2,6-isomer;
TMI: isopropenyl dimethyl benzyl isocyanate (an unsaturated aliphatic isocyanate) sold as TMI® by Allnex;
HEMA: 2-Hydroxyethyl methacrylate from Sigma-Aldrich;
T-12: Dibutyltin dilaurate, commercially available as Dabco T-12 from Air Products;
Isopropanol, a polymer control agent (PCA);
nDM: n-Dodecyl mercaptan, a chain transfer agent (CTA);
STY: styrene;
ACN: acrylonitrile;
INITIATOR 1: tert-butylperoxy-2-ethylhexanoate, commercially available as TBPEH from United Initiators;
INITIATOR 2: 2,2'-azobisisobutyronitrile, a free radical polymerization initiator commercially available as VAZO 64 from E.I. DuPont de Nemours and Co.;
INITIATOR 3: tert-Amylperoxy pivalate, commercially available as Trigonox 125-C75 from Nouryon;
INITIATOR 4: 1,1-Di(tert-Amylperoxy)cyclohexane, commercially available as Trigonox 122-C80 from Nouryon;
DEOA-LF: Diethanolamine, a commercially available foam crosslinker/foam modifier that is commercially available from Air Products;
DC 5043: A silicone surfactant commercially available from Dow;
NIAX A-1: Amine catalyst which is commercially available from Momentive Performance Materials under the name NIAX A-1; and NIAX A-33: Amine catalyst which is commercially available from Momentive Performance Materials under the name NIAX A-33.

PMPO Properties

Viscosity: viscosities were measured by Canon-Fenske kinematic viscometer (centistokes cSt at 25° C.)

Filterability Test: Filterability is determined by diluting one part by weight sample (e.g. 200 grams) of PMPO with two parts by weight isopropanol (e.g. 400 grams) to remove any viscosity-imposed limitations and using a fixed quantity of material in relative to a fixed cross-sectional area of screen (e.g. 1⅛ in. diameter), such that all of the PMPO and isopropanol solutions passes by gravity through a 150-mesh or 700-mesh screen. The 150-mesh screen has a square mesh with average mesh opening of 105 microns and it is a "Standard Tyler" 150 square-mesh screen. The 700-mesh screen is made with a Dutch twill weave. The actual screen used had a nominal opening of 30 microns. The amount of sample which passes through the screen within 600 seconds is reported in percent, a value of 100 percent indicates that over 99 weight percent passes through the screen.

Crosslinkers

Crosslinker A. IPDI (688.3 g), T-12 (0.46 g), and 1,4-benzoquinone (0.75 g) were added to a 2 L flask under nitrogen. After heating to 50° C., HEMA (810.6 g) was added rapidly dropwise. The flask contents were heated at 70° C. for 2 hours before analysis showed no free NCO groups.

Crosslinker B. PMDI (103 g), 1,4-benzoquinone (0.2 g), and 200 g styrene solvent were added to a 1 L flask under nitrogen. After heating to 50° C., HEMA (97.8 g) was added rapidly dropwise. The flask contents were heated at 70° C. for 1.5 hours before analysis showed no free NCO groups.

Crosslinker C. Triethyleneglycol dimethacrylate, available from Sigma-Aldrich

Macromer Preparation

Macromer A: Prepared by heating Polyol A (100 parts), TMI (2 parts), and 100 ppm bismuth neodecanoate catalyst at 75° C. for 4 hours.

Macromer B: Prepared by heating Polyol B (100 parts), TMI (0.4 parts), MDI (0.4 parts) and 100 ppm bismuth neodecanoate catalyst at 75° C. for 4 hours.

Macromer C: Prepared by heating Polyol C (100 parts), TMI (0.6 parts), MDI (0.2 parts) and 100 ppm bismuth neodecanoate catalyst at 75° C. for 4 hours.

General Pre-Formed Stabilizer (PFS) Process

This is a general process for the preparation of pre-formed stabilizers (PFS) made from Macromers A, B, and C to give PFS A, B, and C, respectively. Each of the pre-formed stabilizers was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The pre-formed stabilizer then passed through a cooler and into a collection vessel. The formulations used for the pre-formed stabilizer are listed in Table 1, where the component concentrations are based on the total feed.

TABLE 1

|  | PFS |
| --- | --- |
| CTA type | Isopropanol |
| CTA in feed, wt. % | 30-80% |
| Macromer | Macromer |
| Macromer in feed, wt. % | 10-40% |
| Monomers in feed, wt. % | 10-30% |
| Initiator 1 concentration, wt. % | 0.1-2% |

General PMPO Formulations

This series of examples relates to the preparation of PMPOs made from pre-formed stabilizers A, B, and C, respectively. Each of the PMPOs was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The PMPO then passed through a cooler and into a collection vessel. The crude product was vacuum stripped to remove volatiles. The wt-% total polymer in the product was calculated from the concentrations of monomers measured in the crude PMPO before stripping. The parameters used in the experiments are listed in Table 2.

TABLE 2

| Example* | 1 | 2 | 3 | 4 | 5 | 6 | 7 |
| --- | --- | --- | --- | --- | --- | --- | --- |
| Conditions: | | | | | | | |
| Initiator 2 in feed, wt % | 0.25 | 0.29 | 0.30 | 0.32 | — | — | — |
| Initiator 3 in feed, wt % | — | — | — | — | 0.25 | 0.25 | 0.25 |
| Initiator 4 in feed, wt % | — | — | — | — | 0.02 | 0.02 | 0.02 |
| Base polyol | D | D | E | E | E | E | E |
| Base polyol in feed, wt % | 45.7 | 43.3 | 51.6 | 50.8 | 49.4 | 49.2 | 49.3 |
| PFS | A | A | B | B | C | C | C |
| PFS in feed, wt % | 5.5 | 5.5 | 7.8 | 7.8 | 8.33 | 8.33 | 8.33 |
| nDM, wt % | 0 | 0.8 | 0 | 0.8 | 0 | 0 | 0 |
| IPA in feed, wt % | 3.7 | 3.6 | 4.7 | 4.7 | 5.0 | 5.0 | 5.0 |
| Sty in feed, wt % | 31.2 | 31.2 | 25.6 | 25.6 | 26.6 | 16.5 | 16.5 |
| ACN in feed, wt % | 17.0 | 17.0 | 14.8 | 14.8 | 15.4 | 25.6 | 25.6 |
| Crosslinker, (wt %) | 0 | A (1.8) | 0 | A (1.8) | 0 | 0 | C (3.0) |
| Product Properties: | | | | | | | |
| 150-Mesh filtration, % | 100 | 100 | 100 | 100 | 100 | 100 | 100 |
| 700-Mesh filtration, % | 100 | 100 | 100 | 100 | 100 | 100 | 100 |
| Total polymer (stripped product), wt % | 50.4 | 50.3 | 43.0 | 42.9 | 44.7 | 44.6 | 44.4 |
| Viscosity, cSt (25° C.) | 4893 | 5165 | 5247 | 5762 | 6180 | 6171 | 6187 |

*Examples 1, 3, 5, 6 are comparative examples

Foam Preparation

The foams in Table 3 were prepared by mixing the polyol, the surfactant, water, catalysts, and diethanolamine in a flask to create a master blend. Then, the desired amount of PMPO was added to a cup containing the desired amount of master blend. The contents of the cup were mixed for 55 seconds. The desired amount of isocyanate component necessary to give an isocyanate index of 100 was added to the cup containing the master blend and PMPO mixture. The contents of the cup were mixed together for 5 seconds, and the reacting mixture was quickly poured into a 150° F. water-jacketed mold. After 4.5 minutes, the foam was removed from the mold, run through a cell-opening crushing device, and then placed in a 250° F. oven for 30 minutes to post cure. After 24 hours of aging in a controlled temperature and humidity laboratory, the foams were submitted for physical property testing.

TABLE 3

| Component | pphp | pphp | pphp |
| --- | --- | --- | --- |
| PMPO 5 | 50 | | |
| PMPO 6 | | 50 | |
| PMPO 7 | | | 50 |
| Polyol F | 50 | 50 | 50 |
| DC 5043 | 1.0 | 1.0 | 1.0 |
| WATER | 3.54 | 3.54 | 3.54 |
| DEOA-LF | 1.73 | 1.73 | 1.73 |
| Niax A-1 | 0.1 | 0.1 | 0.1 |
| Niax A-33 | 0.24 | 0.24 | 0.24 |
| TDI | 44.54 | 44.54 | 44.54 |
| NCO Index | 100 | 100 | 100 |
| FMVSS-302 Results | | | |
| Burn rate, mm/minute | 75 | 52 | 45 |

As can be seen from the examples in Table 3, the use of a polymer crosslinker for the PMPO formation led to a foam with improved burn properties, as evidenced by the smaller burn rate measured using FMVSS-302 industry test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer polyol (PMPO) comprising polymer particles dispersed in a base polyol, wherein the polymer particles comprise a free radical polymerization reaction product of an ethylenically unsaturated composition comprising a compound of structure (II):

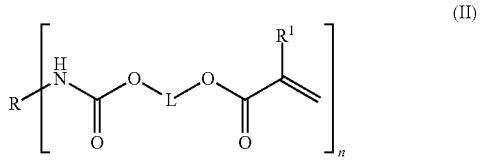

in which: (i) R comprises an alkyl group, an aryl group, an alkylaryl group, or a cycloaliphatic group, each optionally containing a heteroatom; (ii) each L is independently a linking group containing at least 2 carbon atoms; (iii) each $R^1$ is independently H or $CH_3$; and (iv) n has a value of at least 2, wherein the compound of structure (II) is present in an amount of 0.1 to 10% by weight, based on total weight of components used to produce the PMPO.

2. The PMPO of claim 1, wherein the base polyol comprises a polyether polyol having a functionality of 2 to 8 and an OH number of 20 to 400 mg KOH/g and wherein the ethylenically unsaturated composition further comprises styrene and acrylonitrile, wherein styrene and acrylonitrile are present in amounts such that the weight ratio of styrene to acrylonitrile (S:AN) is within the range of 80:20 to 20:80.

3. The PMPO of claim 1, wherein the compound of structure (II) comprises a reaction product of a polyisocyanate and a hydroxy-functional ethylenically unsaturated compound, wherein the polyisocyanate comprises isophorone diisocyanate and/or a diphenylmethane diisocyanate.

4. The PMPO of claim 1, wherein the compound of structure (II) is present in an amount of 1 to 10% by weight, based on the total weight of components used to produce the PMPO.

5. The PMPO of claim 4, wherein the compound of structure (II) is present in an amount of 1 to 5% by weight, based on the total weight of components used to produce the PMPO.

6. A polyurethane foam comprising a reaction product of a reaction mixture comprising: (1) a polyisocyanate component and (2) an isocyanate-reactive component, wherein the isocyanate-reactive component comprise a PMPO of claim 1, wherein the polyisocyanate component and the isocyanate-reactive component are present in amounts to provide an isocyanate index of 70 to 130.

7. A PMPO comprising polymer particles dispersed in a base polyol, wherein the polymer particles comprise a free radical polymerization reaction product of an ethylenically unsaturated composition comprising a compound of structure (IV):

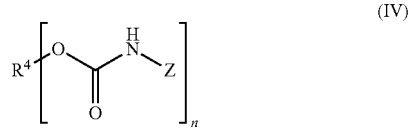

in which: (i) $R^4$ comprises an alkyl or oxyalkyl group containing at least 2 carbon atoms; (ii) Z is an alkyl or aryl group containing reactive unsaturation; and (iii) n has a value of at least 2, wherein the compound of structure (IV) is present in an amount of 0.1 to 10% by weight, based on total weight of components used to produce the PMPO.

8. The PMPO of claim 7, wherein the base polyol comprises a polyether polyol having a functionality of 2 to 8 and an OH number of 20 to 400 mg KOH/g and wherein the ethylenically unsaturated composition further comprises styrene and acrylonitrile, wherein styrene and acrylonitrile are present in amounts such that the weight ratio of styrene to acrylonitrile (S:AN) is within the range of 80:20 to 20:80.

9. The PMPO of claim 7, wherein the compound of structure (IV) is present in an amount of 1 to 10% by weight, based on the total weight of components used to produce the PMPO.

10. The PMPO of claim 9, wherein the compound of structure (IV) is present in an amount of 1 to 5% by weight, based on the total weight of components used to produce the PMPO.

11. A polyurethane foam comprising a reaction product of a reaction mixture comprising: (1) a polyisocyanate component and (2) an isocyanate-reactive component, wherein the isocyanate-reactive component comprise a PMPO of claim 7, wherein the polyisocyanate component and the isocyanate-reactive component are present in amounts to provide an isocyanate index of 70 to 130.

12. A process for preparing a PMPO comprising free-radically polymerizing a reaction mixture comprising: (A) a base polyol; (B) a pre-formed stabilizer; (C) an ethylenically unsaturated composition distinct from the pre-formed stabilizer; (D) a free-radical polymerization initiator; and, optionally, (E) a polymer control agent, wherein the ethylenically unsaturated composition comprises a compound of structure (II):

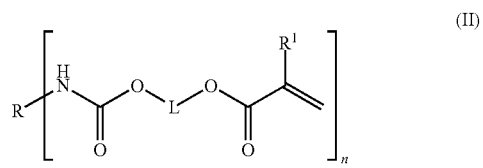

in which: (i) R comprises an alkyl group, an aryl group, an alkylaryl group, or a cycloaliphatic group, each optionally containing a heteroatom; (ii) each L is independently a linking group containing at least 2 carbon atoms; (iii) each $R^1$ is independently H or $CH_3$; and (iv) n has a value of at least 2, wherein the compound of structure (II) is present in an amount of 0.1 to 10% by weight, based on total weight of components used to produce the PMPO.

13. The process of claim 12, wherein the base polyol comprises a polyether polyol having a functionality of 2 to 8 and an OH number of 20 to 400 mg KOH/g and wherein the ethylenically unsaturated composition further comprises styrene and acrylonitrile, wherein styrene and acrylonitrile are present in amounts such that the weight ratio of styrene to acrylonitrile (S:AN) is within the range of 80:20 to 20:80.

14. The process of claim 12, wherein the compound of structure (II) comprises a reaction product of a polyisocyanate and a hydroxy-functional ethylenically unsaturated compound, wherein the polyisocyanate comprises isophorone diisocyanate and/or a diphenylmethane diisocyanate.

15. The process of claim 12, wherein the compound of structure (II) is present in an amount of 1 to 10% by weight, based on the total weight of components used to produce the PMPO.

16. The process of claim 15, wherein the compound of structure (II) is present in an amount of 1 to 5% by weight, based on the total weight of components used to produce the PMPO.

17. A process for preparing a PMPO comprising free-radically polymerizing a reaction mixture comprising: (A) a base polyol: (B) a pre-formed stabilizer; (C) an ethylenically unsaturated composition distinct from the pre-formed stabilizer; (D) a free-radical polymerization initiator; and, optionally, (E) a polymer control agent, wherein the ethylenically unsaturated composition comprises a compound of structure (IV):

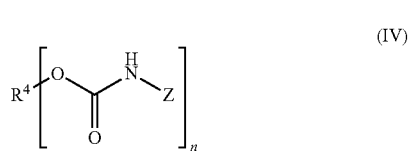

in which: (i) $R^4$ comprises an alkyl or oxyalkyl group containing at least 2 carbon atoms; (ii) Z is an alkyl or aryl group containing reactive unsaturation; and (iii) n has a value of at least 2, wherein the compound of structure (IV) is present in an amount of 0.1 to 10% by weight, based on total weight of components used to produce the PMPO.

18. The process of claim 17, wherein the base polyol comprises a polyether polyol having a functionality of 2 to 8 and an OH number of 20 to 400 mg KOH/g and wherein the ethylenically unsaturated composition further comprises styrene and acrylonitrile, wherein styrene and acrylonitrile are present in amounts such that the weight ratio of styrene to acrylonitrile (S:AN) is within the range of 80:20 to 20:80.

19. The process of claim 17, wherein the compound of structure (IV) is present in an amount of 1 to 10% by weight, based on the total weight of components used to produce the PMPO.

20. The process of claim 19, wherein the compound of structure (IV) is present in an amount of 1 to 5% by weight, based on the total weight of components used to produce the PMPO.

* * * * *